US005878839A

United States Patent [19]

Lin

[11] Patent Number: 5,878,839

[45] Date of Patent: Mar. 9, 1999

[54] SUPPORT DEVICE FOR WORK PIECE

[76] Inventor: Huang Lung Lin, No. 33-2, Pu Gang Road, Pu Yien Hsiang, Chang Hua Hsien, Taiwan

[21] Appl. No.: 847,015

[22] Filed: May 1, 1997

[51] Int. Cl.$^{6}$ .................................................. F16M 11/00

[52] U.S. Cl. ........................................ 182/181.1; 182/153

[58] Field of Search ................................ 182/181.1, 224, 182/153, 225, 182.1

[56] References Cited

U.S. PATENT DOCUMENTS 4,237,592 12/1980 Kuge .

5,299,656 4/1994 Grill .

*Primary Examiner*—Alvin Chin-Shue

[57] ABSTRACT

A support device includes a bracket secured on a base for rotatably supporting a roller and for engaging with and for supporting a work piece. A stick is secured in the base and has an orifice for slidably engaging with a rod which is extended downward from the bracket for allowing the bracket to be adjusted to a suitable height. The bracket includes a pair of blocks for slidably receiving a pair of poles. The poles each includes an extension extended upward for engaging with the work piece and for preventing the work piece from moving laterally.

4 Claims, 7 Drawing Sheets

SUPPORT DEVICE FOR WORK PIECE

BACKGROUND OF THE INVENTION

1. Field of the Invention

The present invention relates to a support, and more particularly to a support device for guiding a work piece into a working machine.

2. Description of the Prior Art

Typical working machines, particularly the wood working machines, such as planers, cutting machines, sewing machines, is required to be supplied with a long wood work piece. One free end of the work piece is normally held by another worker or simply supported by a table. However, the table may not be adjusted to different height for suitably supporting and supplying the work piece into the working machine.

The present invention has arisen to mitigate and/or obviate the afore-described disadvantages of the conventional work piece support devices.

SUMMARY OF THE INVENTION

The primary objective of the present invention is to provide a support device for suitably and smoothly supporting and supplying the work piece into the working machine.

In accordance with one aspect of the invention, there is provided a support device for a work piece, the support device comprises a base, a bracket secured on the base, and a roller rotatably supported in the bracket for engaging with and for supporting the work piece.

The base includes a stick, the stick includes an orifice, the bracket includes a rod extended downward and slidably engaged in the orifice of the stick, and the stick includes means for securing the rod to the stick.

The base includes a pair of beams, a pair of frames having an upper portion pivotally coupled to the beams, and a pair of bars secured between the frames, the stick is secured between the bars.

A first of the beams includes a bolt, the base includes a first plate secured on one end of the beams and includes a second plate threadedly engaged with the bolt, and means for rotating the bolt and for moving the second plate toward and away from the first plate.

The bracket includes a pair of flanges extended upward, the roller includes two end caps and includes a shaft having two ends rotatably supported in the flanges, the shaft includes two stops and two springs biased between the end caps and the stops for allowing the ends of the shaft to be moved inward of the roller against the springs.

The bracket includes a pair of blocks, a pair of poles slidably engaged in the blocks and each having an extension extended upward for engaging with the work piece and for preventing the work piece from moving laterally, and means for securing the poles to the blocks.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
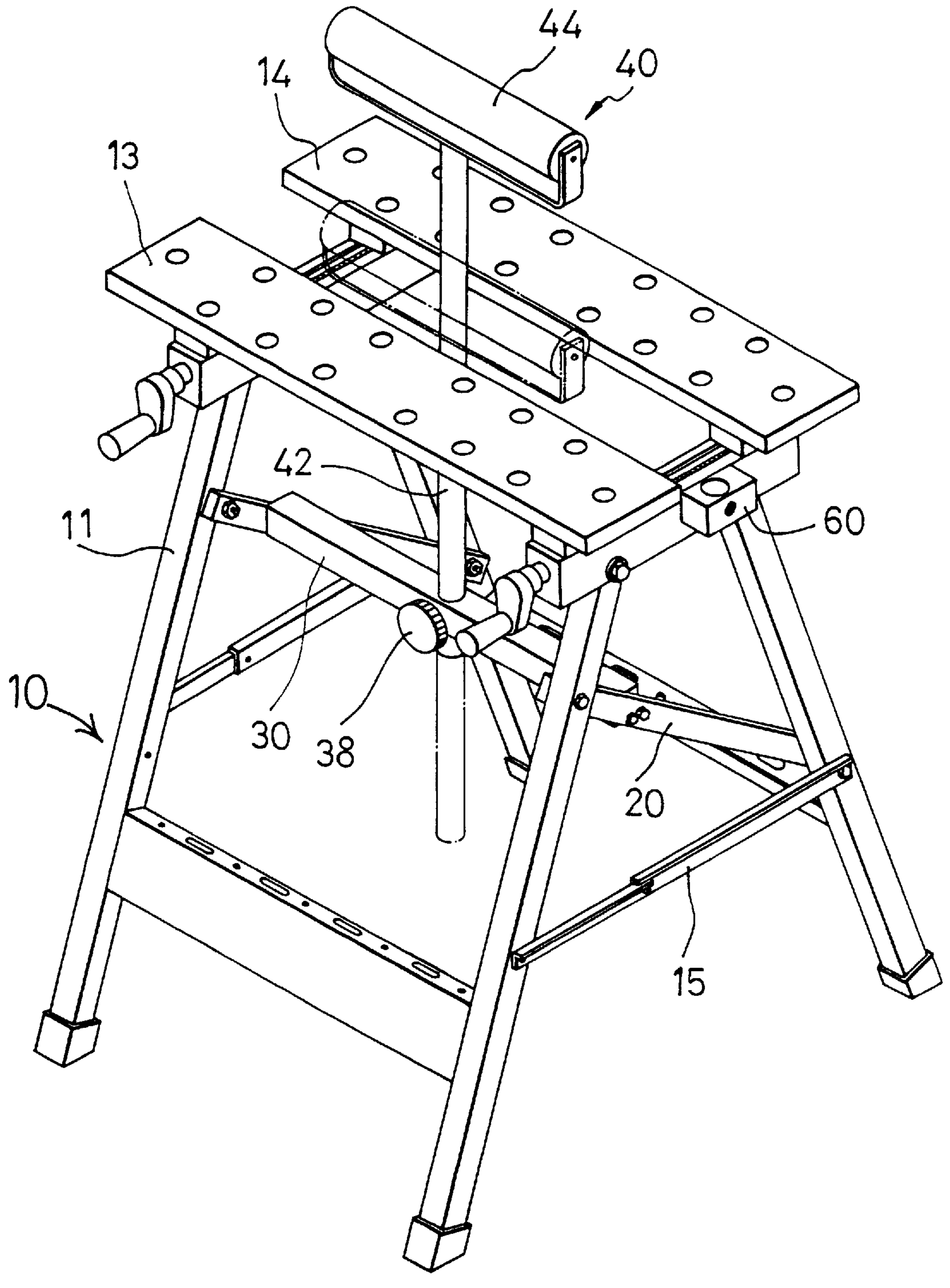
FIG. 1 is a perspective view of a support device in accordance with the present invention.
Figure 2:
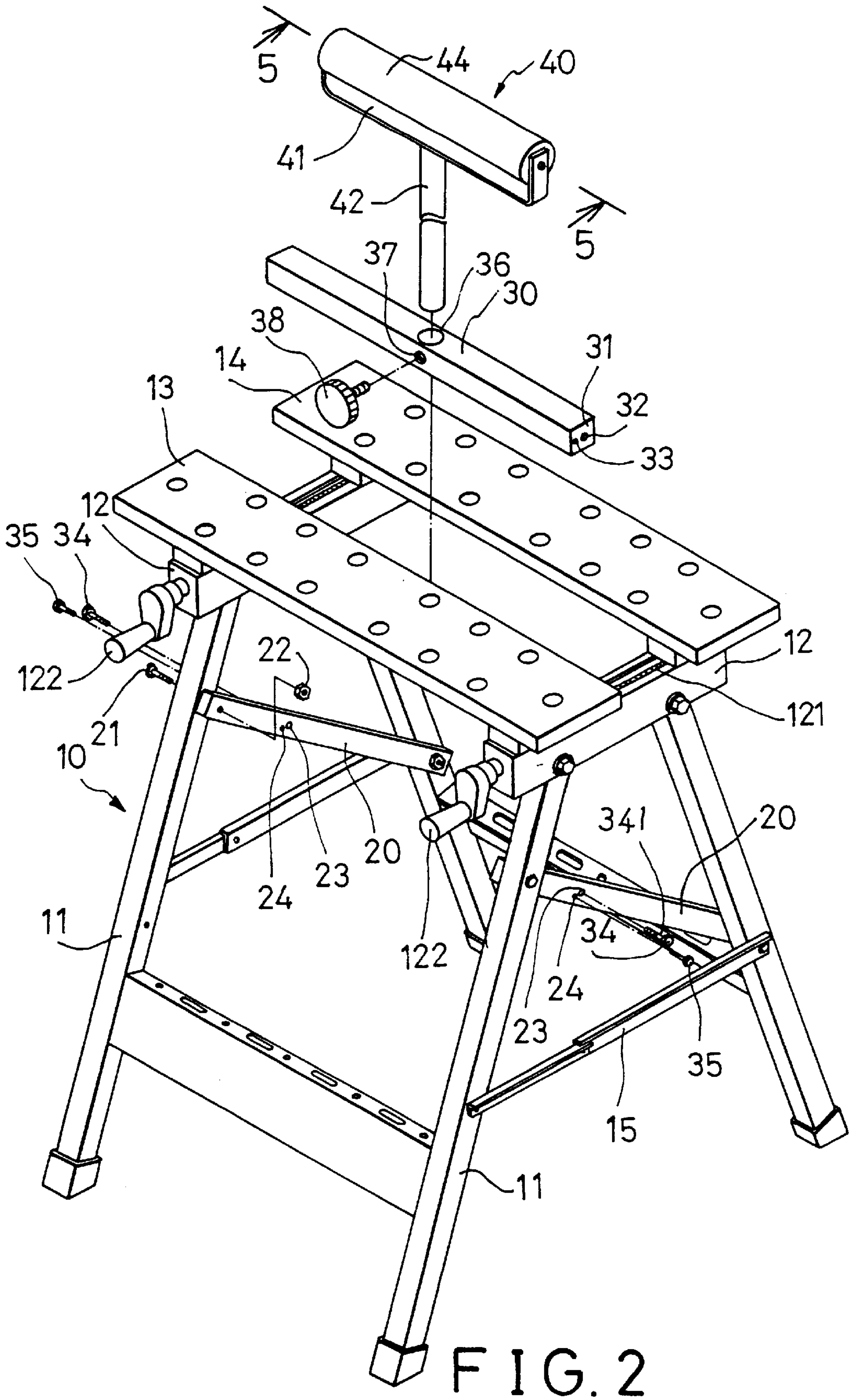
FIG. 2 is a partial exploded view of the device.
Figure 3:
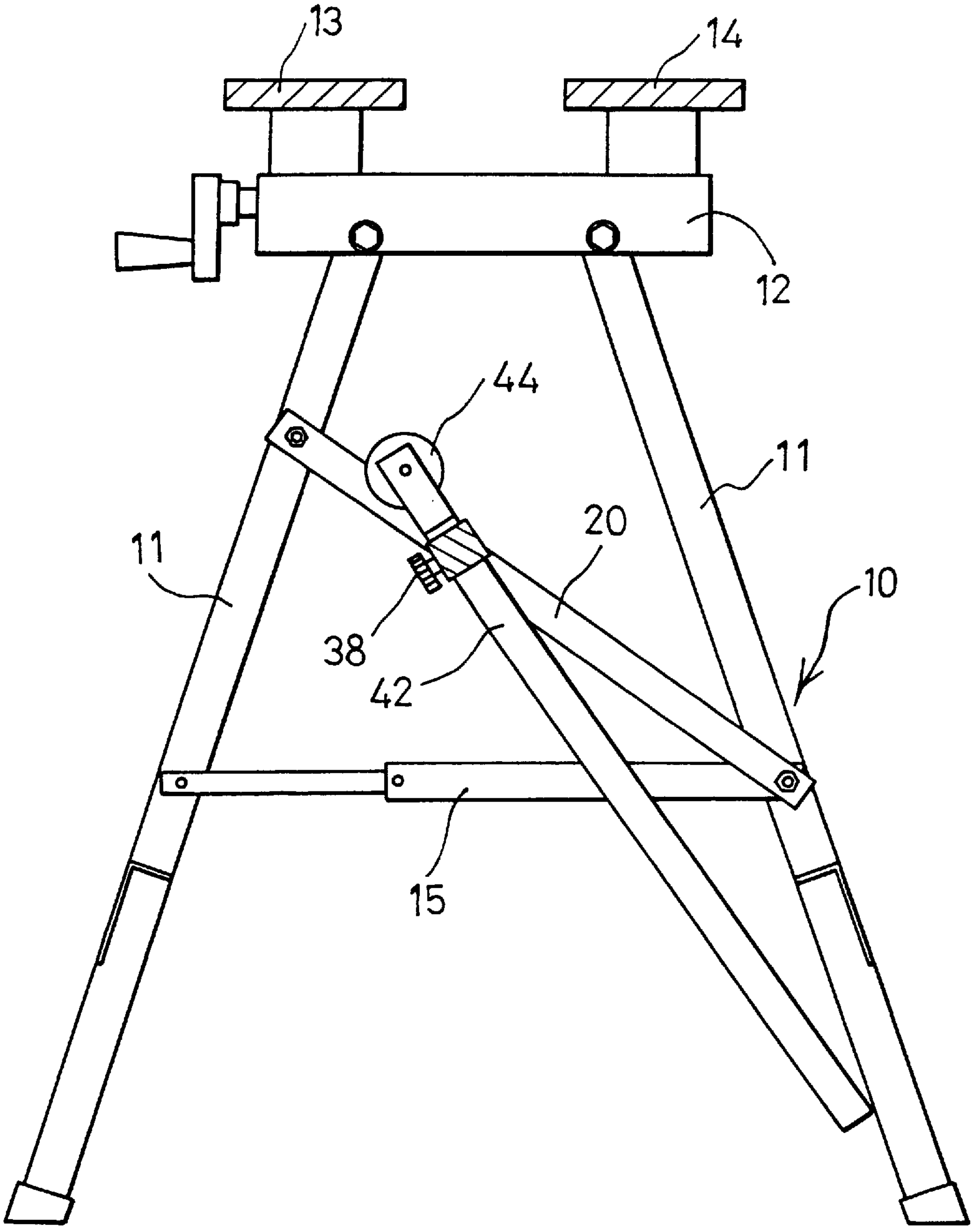
FIGS. 3 and 4 are schematic views illustrating the folding operation of the support device.

Referring to the drawings, and initially to FIGS. 1–3, a support device in accordance with the present invention is provided for supporting and for smoothly supplying a work piece 100 (FIG. 7) to a working machine. The support device comprises a work table or a base 10 including a pair of frames 11 having an upper portion pivotally coupled to a pair of beams 12 and having a middle portion coupled together by a pair of typical foldable links 15. A pair of bars 20 are further pivotally coupled between the middle portions of the frames 11. A first plate 13 is secured on top of the beams 12. The beams 12 each includes a rotatable bolt 121 which includes a handle 122 for rotating the bolt 121. A second plate 14 has a bottom portion engaged with the bolts 121 for allowing the second plate 14 to be moved toward or away from the first plate 13 by the bolts 121.

A stick 30 has two ends 31 engaged with the bars 20 and pivotally coupled to the bars 20 at a pivot axle by bolts 34 which are engaged through the holes 23 of the bars 20 and engaged with the holes 32 of the stick 30. The body 341 of one of the bolts 34 includes a longer length for allowing the stick 30 to be rotated about the pivot axle formed by the bolts 34. One or two bolts 35 may selectively engage through the holes 24 of the bars 20 and may engage with the holes 33 of the stick 30 for securing the stick 30 in place. The stick 30 includes an orifice 36 formed in the middle portion and includes a screw hole 37 perpendicular to the orifice 36 for engaging with a fastener 38.

Figure 5:
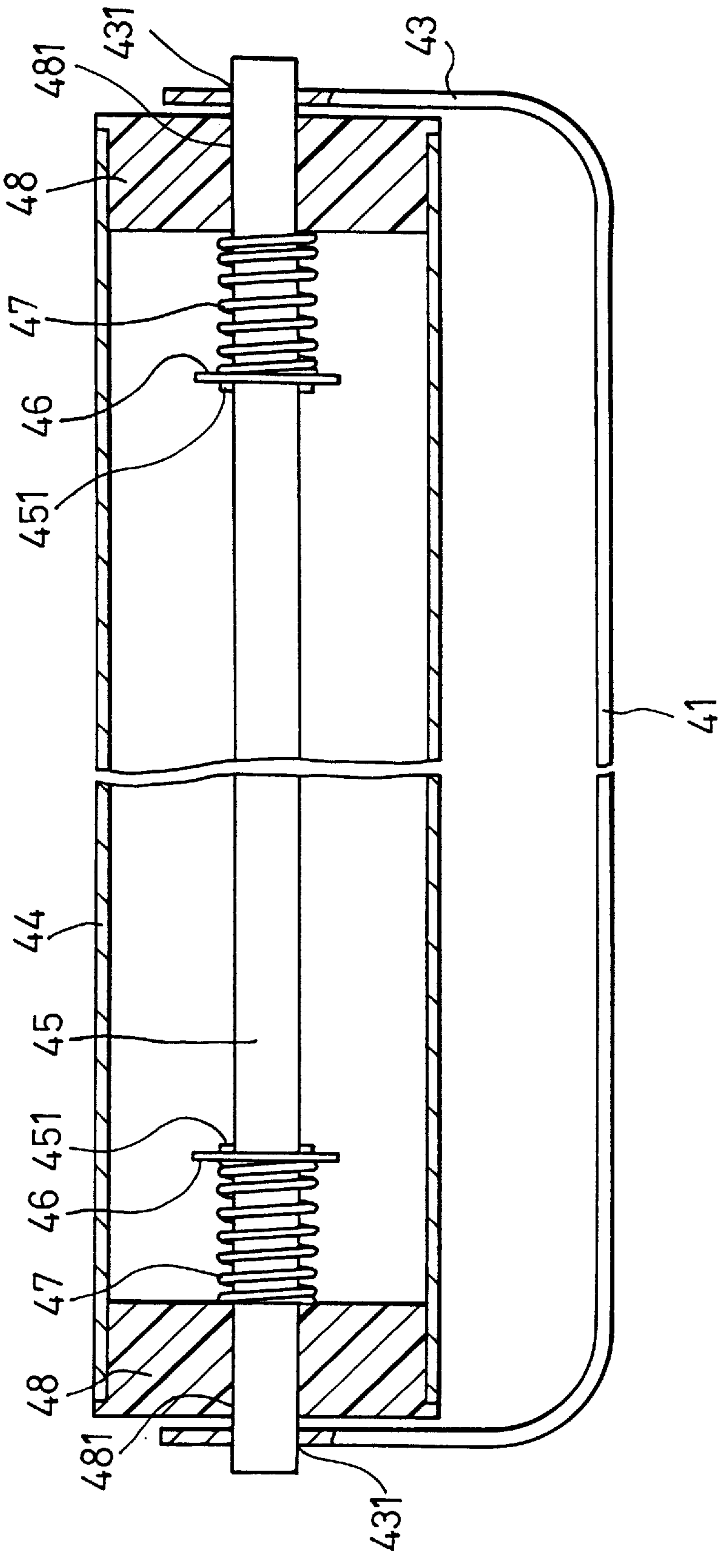
FIG. 5 is a cross sectional view taken along lines 5—5 of FIG. 2, and FIGS. 6 and 7 are perspective views illustrating the application of the roller supporting bracket.

A roller support 40 includes a bracket 41 for supporting a roller 44 and a rod 42 extended downward form the bracket 41 for slidably engaging in the orifice 36 of the stick 30. The fastener 38 may secure the rod 42 to the stick 30 after the bracket 41 has been adjusted to the suitable height. As shown in FIG. 5, the bracket 41 includes a pair of flanges 43 extended upward from the side portions for rotatably supporting a shaft 45. The roller 44 has two end caps 48. The shaft 45 is engaged through the holes 481 of the end caps 48 and the holes 431 of the flanges 43. The shaft 45 includes two stops 451 for engaging with two washers 46 respectively. Two springs 47 are biased between the end caps 48 and the washers 46 for allowing the end portions of the shaft 45 to be moved inward of the roller 44 against the springs 46 and for allowing the roller 44 to be engaged onto the bracket 41.

Figure 6:
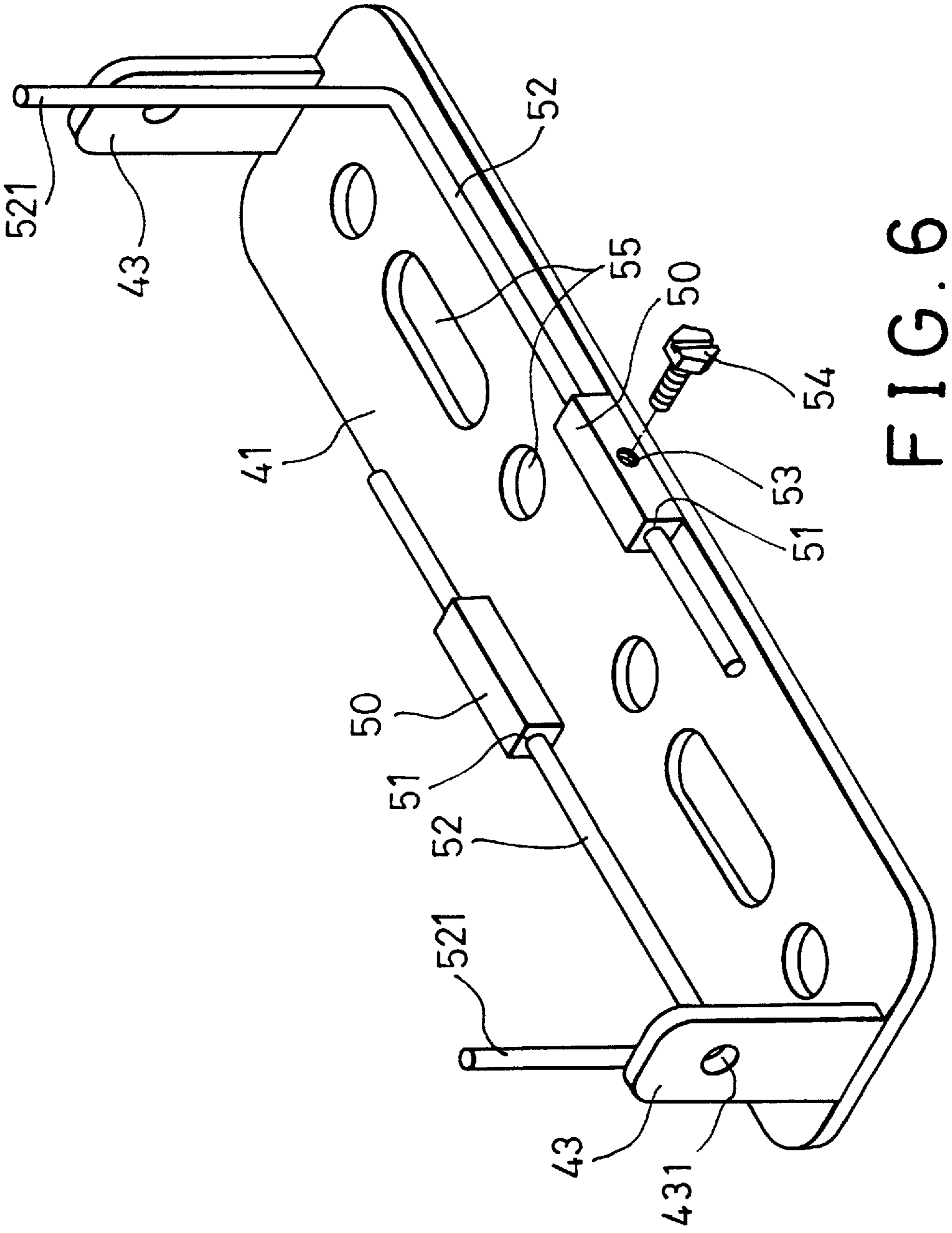
Figure 7:
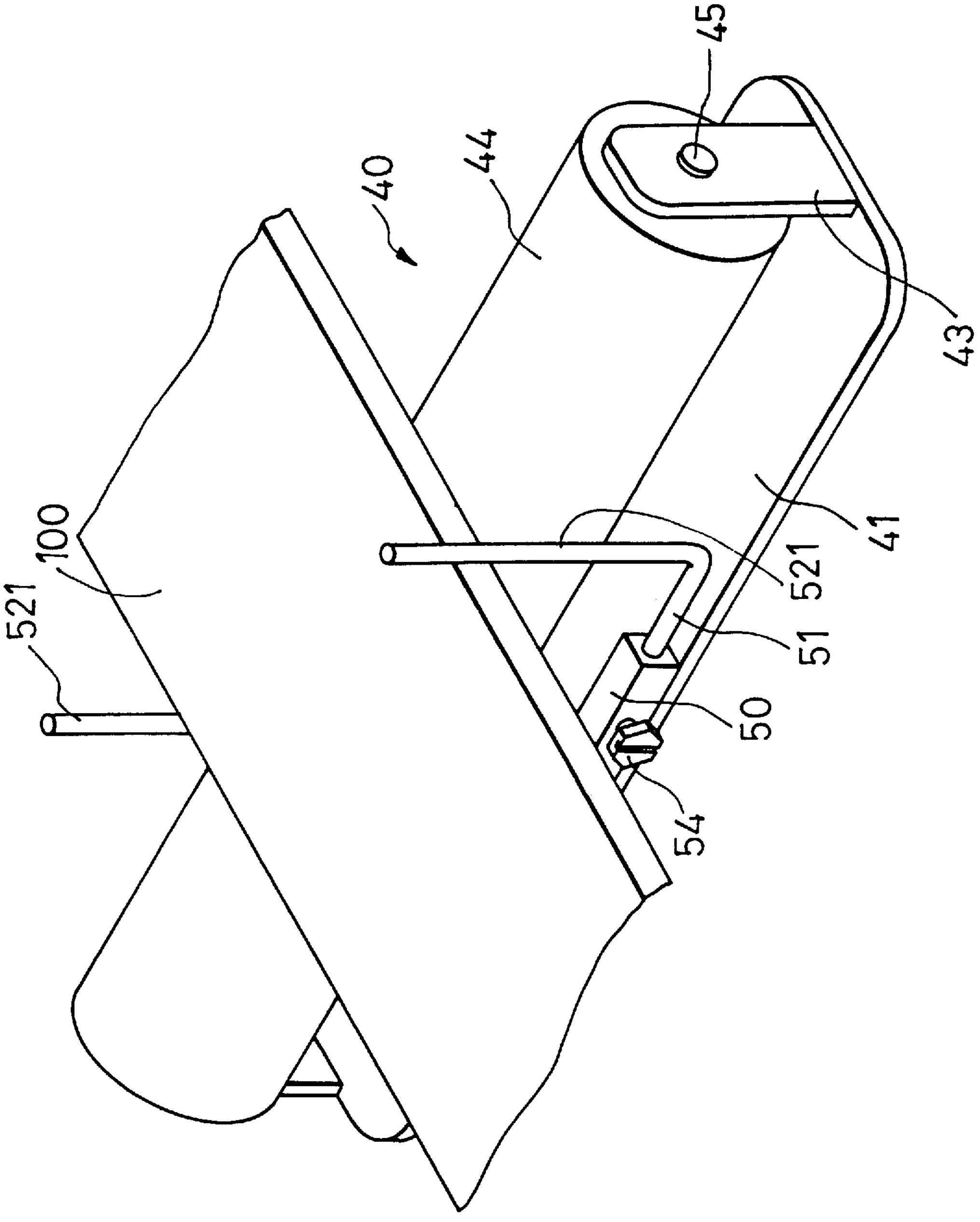

Referring next to FIGS. 6 and 7, the bracket 41 includes a pair of blocks 50 provided in the middle portion and each having a hole 51 for slidably engaging with a pole 52. Two fasteners 54 may engage through the screw holes 53 of the blocks 50 for securing the poles 52 in place. The poles 52 each includes an extension 521 extended upward for engaging with the work piece 100 and for positioning the work piece and for preventing the work piece from moving laterally. The bracket 41 may include a number of openings 55 for supporting screw drivers, wrenches or other tools when the roller 44 is disengaged from the bracket 41.

Figure 4:
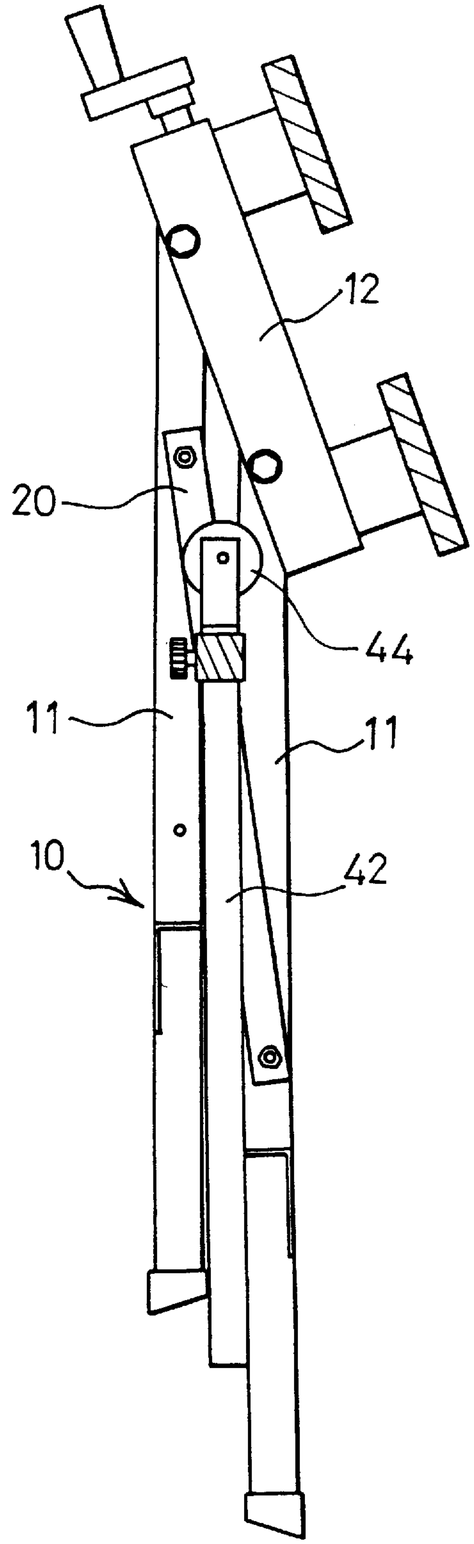

Referring next to FIG. 4 and again to FIG. 3, the rod 42 may be lowered when the fastener 38 is disengaged from the rod 42. The stick 30 and the rod 42 may be rotated freely when the fasteners 35 are disengaged from the stick 30. The frames 11 of the base 10 may be folded to the compact configuration as shown in FIG. 4 when the typical foldable links 15 are folded either upward or downward. Accordingly, the support device may be folded to a rather compact configuration which is excellent for transportation and storing purposes.

As shown in FIG. 1, the base 10 may further includes a lug 60 having an orifice for engaging with the rod 42 and for allowing the rod 42 to be secured to the side portion of the base 10.

Accordingly, the support device in accordance with the present invention includes a roller 44 that may be adjusted to the suitable height for smoothly supplying the work piece into the working machine. In addition, the extensions 521 may further stably supplying the work piece to the working machine.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device for a work piece, said support device comprising:

a base including a stick having an orifice formed therein, a bracket secured on said base including a rod extended downward and slidably engaged in said orifice of said stick, means for securing said rod to said stick, and a roller rotatably supported in the bracket for engaging with and for supporting the work piece, said base including a pair of beams, a pair of frames having an upper portion pivotally coupled to said beams, and a pair of bars secured between said frames, said stick being secured between said bars.

2. The support device according to claim 1, wherein a first of said beams includes a bolt, said base includes a first plate secured on one end of said beams and includes a second plate threadedly engaged with said bolt, and means for rotating said bolt and for moving said second plate toward and away from said first plate.

3. The support device according to claim 1, wherein said bracket includes a pair of flanges extended upward, said roller includes two end caps and includes a shaft having two ends rotatably supported in said flanges, said shaft includes two stops and two springs biased between said end caps and said stops for allowing said ends of said shaft to be moved inward of said roller against said springs.

4. A support device for a work piece, said support device comprising:

a base, a bracket secured on said base, said bracket including a pair of blocks, a pair of poles slidably engaged in said blocks and each having an extension extended upward for engaging with the work piece and for preventing the work piece from moving laterally, and means for securing said poles to said blocks, and a roller rotatably supported in the bracket for engaging with and for supporting the work piece.

* * * * *